United States Patent [19]

Gordy et al.

[11] 4,325,799

[45] Apr. 20, 1982

[54] FORMATION APPARATUS FOR ELECTROLYTIC CELL

[75] Inventors: Lester A. Gordy; David A. Poff, both of Gainesville, Fla.

[73] Assignee: General Electric Company, Gainesville, Fla.

[21] Appl. No.: 242,544

[22] Filed: Mar. 11, 1981

Related U.S. Application Data

[63] Continuation of Ser. No. 145,736, May 1, 1980, abandoned.

[51] Int. Cl.³ ............................................. C25D 17/08
[52] U.S. Cl. .................................. 204/297 W; 204/21
[58] Field of Search ................. 204/297 R, 297 W, 2.1

[56] References Cited

U.S. PATENT DOCUMENTS 2,073,679  3/1937  Brown ........................... 204/297 W
4,152,241  5/1979  Warren .......................... 204/297 W Primary Examiner—T. M. Tufariello
Attorney, Agent, or Firm—Morgan, Finnegan, Pine, Foley & Lee

[57] ABSTRACT

A system for the formation of the electrodes of an electrolytic cell, such as a lead acid cell, is built of cabinets housing panels, each of which supports an array of the cells. The cells are connected to a source of electric power for charging and discharging the cells during the formation operation. The connection of the cells to the power source is accomplished by strip conductors located behind apertures in the panels wherein the cells are placed and through which access to the conductors is provided for the cell terminals. Edges of the conductors are offset relative to the apertures, corresponding to an asymmetry in the location of the terminals of a cell, to provide a keying of the connection. The cells are securely grasped by friction forces exerted on the terminals by resilient edges of the conductors.

14 Claims, 3 Drawing Figures

FORMATION APPARATUS FOR ELECTROLYTIC CELL

This is a continuation of application Ser. No. 145,736 filed May 1, 1980 now abandoned.

BACKGROUND OF THE INVENTION

This invention relates to apparatus used in the formation of electrolytic cells and, more particularly, to apparatus having strip conductors for contacting the cell terminals.

Electrolytic cells are employed individually and in a series connection, referred to as batteries, for electrically energizing numerous forms of electric circuits ranging from scientific devices to amusement devices. One well-known type of cell, the lead acid cell, is produced in a manufacturing operation wherein the last step in the manufacture of the cell is the formation of the electrodes by charging and discharging the cell by means of an electric current. The electric current is applied by a forming apparatus to the terminals of the cell. Due to the large numbers of such cells which are produced commercially, the forming apparatus is connected to many cells for the simultaneous forming of the cells. The connections may be accomplished by individually attaching cell terminals, as by clip leads, to the forming apparatus.

A problem arises in the connection of large numbers of individual cell terminals to the forming apparatus in that such a connection procedure requires significantly more time by production personnel than would be desirable on the production line. Also, there is the possibility of a misconnection or of a poor connection of a cell to the forming apparatus. The need for allowing sufficient time to make such connections on the production line has been recognized over the many years that such electrolytic cells have been manufactured. In spite of the long felt need for a reduction in the time to make the connections, for a simplification of the connection procedure, and for elimination of the chance of misconnection, it appears that the need has not been adequately met by present day forming apparatus.

SUMMARY OF THE INVENTION

The aforementioned problems are overcome and other advantages are provided by a forming system for electrolytic cells which, in accordance with the invention, utilizes strip conductors for contacting the terminals of the cells. The strip conductors are arranged within a panel behind rows of apertures through which access to the conductors is provided for the cell terminals. An edge of a strip conductor is resiliently yieldable and exerts a spring force against a stationary member spaced a predetermined distance from the edge of each aperture. The predetermined spacing is equal to the distance of one of the cell terminals from the edge of the cell to enable a gripping of the cell terminal upon insertion of the cell terminal between the edge of the conductor and the stationary member. The cell is then held securely by its terminal gripped by the friction of the spring force.

A series connection between the successive rows is employed for connection of the cells in a series-parallel matrix. Such a connection is conveniently implemented with opposed sides of each strip conductor being formed in the manner of elongated spring tabs, or rails, which are configured for gripping tab, stud, or other form of projecting terminals of electrolytic cells. As a result, contact is readily made between the terminals and the conductors by simply pressing the cell terminals against the edges of the strip conductors. The resulting configuration of the cells mounted on the panel of the forming system is an array of rows and columns.

A feature of the invention is found in the placement of the conductors to overlap a portion of the apertures of adjacent rows, the width of the conductors being selected to provide that the aforementioned opposed edges have the required spacing from the edges of the apertures for gripping the terminals. This provides the series parallel connection by a contacting of the edges thereof with a terminal of each cell in one of the adjacent rows of apertures, as well as with a terminal of each cell in the other of the adjacent rows of apertures. Since cells having tab type terminals are manufactured with the terminals asymmetrically positioned about the end of the cell, the apertures of the panel are correspondingly offset relative to the strip conductors to provide for a keying of the connection between the cell terminals and the conductors. Thereby, it is insured that the positive terminal will contact the positive conductor and that the negative terminal will contact the negative conductor.

BRIEF DESCRIPTION OF THE DRAWINGS

The foregoing features and other aspects of the invention are explained in the following description taken in connection with the accompanying drawings wherein.

DESCRIPTION OF THE PREFERRED EMBODIMENT

Figure 1:
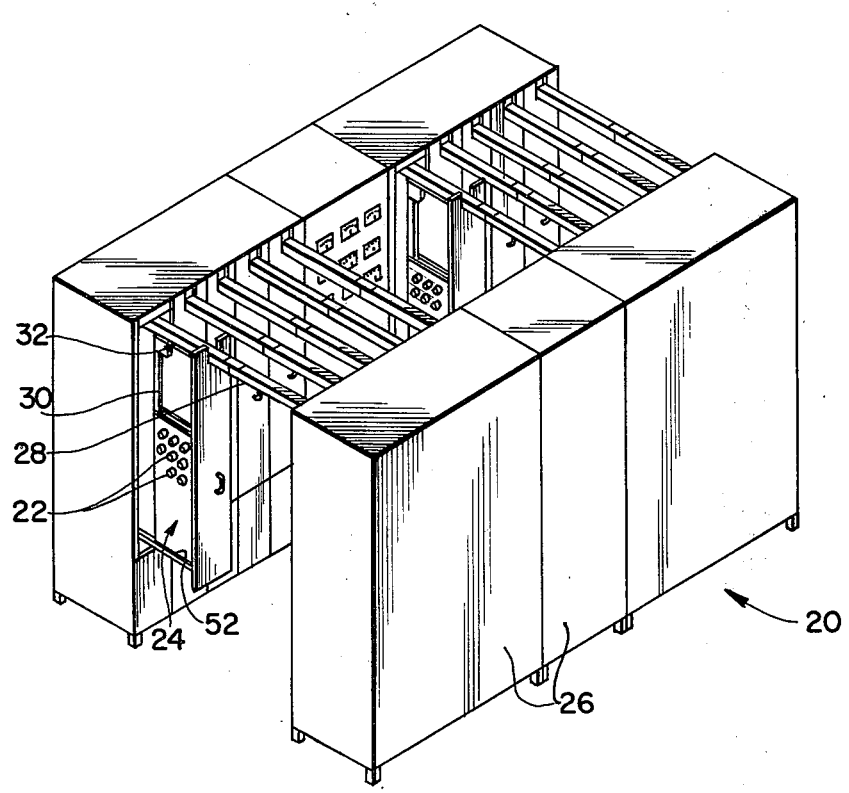
FIG. 1 is a stylized isometric view of a system incorporating the invention for forming electrolytic cells.

Referring now to FIG. 1, there is seen a system 20 for performing the final step in the assembly of an electrolytic cell 22, such as a lead acid cell, the final step being the forming of the cell 22 by applying an electric current thereto. The system 20 includes panels 24 each of which supports many cells 22 which are formed simultaneously. For example, a panel 24 may support an array of cells 22 arranged in 20 rows of 10 cells to give a total of 200 cells.

The system 20 is conveniently built of two rows of cabinets 26 which are joined by rails 28. The cabinets 26 include electrical circuitry (not shown) which provides the power for forming the cells 22. Pairs of panels 24 are mounted back-to-back and supported on frames 30 which, in turn, are connected to the rails 28 by trolleys 32. The frames 30 and the panels 24 thereon thus ride on the rails 28 and may be readily pulled out from a cabinet 26 for insertion or removal of the cells 22. A frame 30 carrying a full load of cells 22 is substantially heavier than the frame 30 with empty panels 24 so that bracing of the cabinets 26 is required, particularly when a number of the frames 30 are pulled out, to insure that a cabinet 26 does not overturn. The aforementioned connection of the two rows of cabinets 26 provides the bracing and provides a relatively simple structure which is readily installed without the necessity for bolting a cabinet to the floor.

Figure 2:
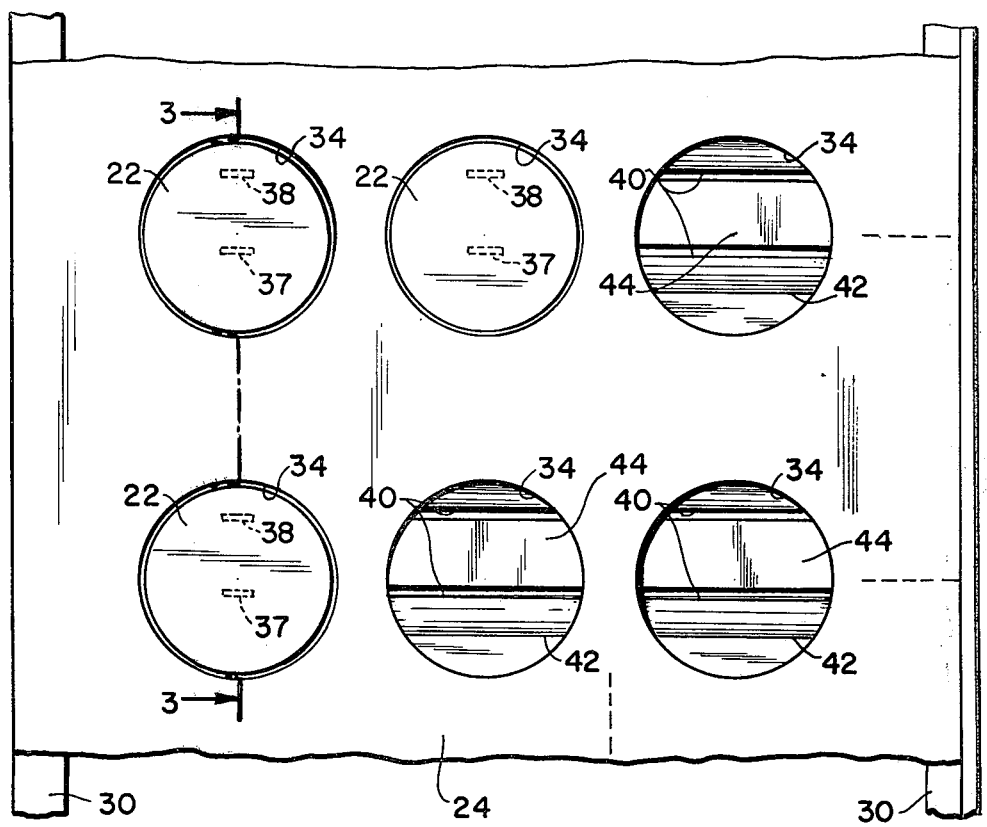
FIG. 2 is a plan view of a portion of a panel showing the offset relationship between the locations of an aperture and a strip connector for keying the connection of cell terminals with strip conductors.
Figure 3:
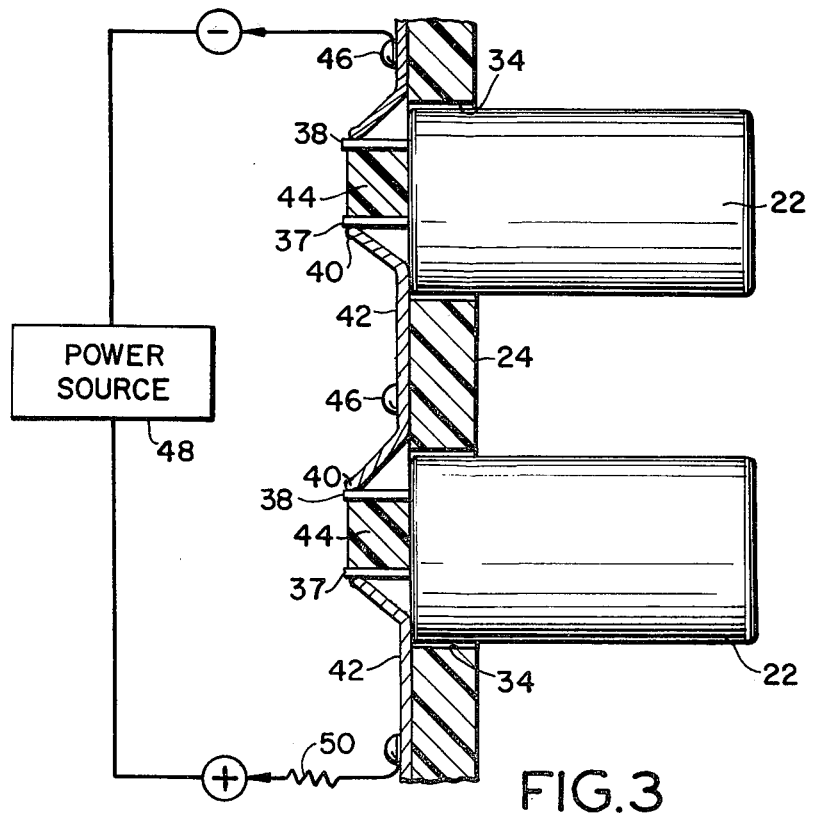
FIG. 3 is an enlarged sectional view of a portion of the panel, taken along the line 3—3 in FIG. 2, showing the locations of cell terminals in contact with strip conductors.

Referring now to FIGS. 2 and 3, two exemplary rows of apertures 34 are shown in a panel 24 mounted on one side of a frame 30. Only a few of the apertures 34 have been illustrated to facilitate the description; in practice the panel 24 is provided with ten apertures per row to accommodate ten smaller size cells, while a lesser number of apertures may be utilized in the event that larger cells are to be charged. Cells 22 are shown emplaced in some of the apertures 34 with their tab shaped terminals 37-38 engaging resiliently yieldable edges 40 of strip conductors 42. The panel 24 is made of a rigid electrically insulating material such as nylon or polycarbonate, the apertures, 34 being formed by a milling operation on the front side of the panel 24 while a spacer bar 44 is formed by a milling operation on the reverse side of the panel 24. In FIG. 2, the terminals 37-38 are shown in phantom to indicate their positions between the edges 40 of the horizontally extending conductors 42 and the spacer bar 44, the edges 40 having the appearance of rails which grip the terminals 37-38 with a frictional spring force. The conductors 42 are secured by screws 46 to the back side of the panel 24.

In accordance with the invention, the panel 24 supports the cells 22 by their terminals 37-38. The regions between the apertures 34 provide strength to the panel 24 and are integrally formed with the spacer bars 44 which run behind the apertures 34. The conductors 42 are formed of copper which is alloyed in a well-known manner to be sufficiently rigid to produce a strong spring force capable of gripping the terminals 37-38 between the edges 40 of the conductors 42 and the spacer bar 44 for supporting the inserted cells. The spacer bar 44 and conductor 42 are asymmetrically positioned relative to a center line of a row of apertures 34 so as to accommodate the asymmetry in the locations of the terminals 37-38, the positive terminal 37 being located more closely to the axis of the cell 22 than the negative terminal 38.

As illustrated in FIG. 3, upon connecting the outermost conductors 42 to the terminals of a power source 48, as is shown diagrammatically for the case of two rows of cells 22, a voltage drop appears across each of the rows of cells 22. The sum of the voltage drops is equal to the voltage of the source 48, the voltage thereof being selected in accordance with the number of rows of cells 22 which are to be charged. A current limiting resitor 50 is also advantageously connected in series between the array of cells 22 and the source 48.

The system 20 provides convenience and safety during the battery charging operation. By pulling the frames 30 out of the cabinets 26, the cells 22 become readily accessible for insertion and removal from the panels 24. When the frames 30 are pushed back into the cabinets 26, the cells 22 are fully enclosed within the cabinets 26 wherein the temperature can be preset at a specific value and held constant at the specific value. Also, even when a frame 30 is pulled out from a cabinet 26, the terminals 37-38 and the entire end of each cell 22 is covered by a panel 24 to protect personnel from inadvertent contact with any portion of a high current circuit. Insertion of the cells 22 within the apertures 34 of a panel 24 is also facilitated by the foregoing mechanical structure which prevents an incorrect, or reversed, connection between the cell terminals 37-38 and the conductors 42. Thus the offset position of the terminals 37-38 and the corresponding offsetting of the edges 40 of the conductors 42 relative to the apertures 34 keys the terminals 37-38 to the conductors 42 of correct polarity. An apertures 34 will not receive any cell wherein its terminals are incorrectly positioned or are reversed. Also, the panels 24 may be mounted to the frames 30, which are preferably made of steel for adequate strength, simply by clamps (not shown) at the top and by a bracket 52 (seen in FIG. 1) at the bottom of the frame 30. Such a mounting permits the panels 24 to be interchanged with other panels for other sizes of cells. The horizontal attitude of the spacer bars 44, along with the spring force of the conductors 42, insures that the tab shaped terminals 37-38 will not pull loose from the weight of the cells 22. Accordingly, the system 20 is well suited for use on the assembly line in the manufacture of electrochemical cells 22.

It is to be understood that the above-described embodiment of the invention is illustrative only and that modifications thereof may occur to those skilled in the art. Accordingly, this invention is not to be regarded as limited to the embodiment disclosed herein, but is to be limited only as defined by the appended claims.

What is claimed is:

1. A system for electrical activation of a set of electrochemical cells each of which is formed with an end wall having first and second terminals protruding therefrom and asymmetrically positioned relative to the center of said end wall, said system comprising:

a panel having a row of apertures, each of said apertures being configured for admitting the end wall of a cell and the terminals thereof;

first and second strip conductors having corresponding edges parallel to said row of apertures and positioned for engagement with said terminals of said cells upon insertion of the end walls of said cells into respective ones of said apertures, said corresponding edges being asymmetrically positioned relative to said row of apertures in correspondence with the asymmetry in the location of said terminals of a cell for keying the orientation of a cell inserted through one of said apertures, thereby keying the engagement of said first terminal with said first conductor.

2. A system according to claim 1 wherein said panel includes means coacting with said edge of said conductor for gripping said one terminal in each of said cells.

3. A system according to claim 1 wherein edges of said conductors overlap the apertures in said row.

4. A system for electrical activation of a set of electrochemical cells each of which is cylindrically shaped with an end wall having first and second terminals protruding therefrom and asymmetrically positioned relative to the center of said end wall, said system comprising:

a panel having apertures arranged in a series of rows, said apertures having diameters commensurate with the diameters of said cells to permit engagement of said cells within said apertures; said apertures, upon engagement with said cells, positioning said cells on said panel with the terminals of said cells protruding through said apertures;

strip conductors having first and second opposed side contacting rails, said strip conductors being arranged parallel to said rows, said first rail overlapping one row of apertures by a first amount of overlapping and said second rail overlapping a second row of apertures by a second amount different from said first amount in correspondence with the asymmetry in the locations of said terminals in one of said cells, thereby providing a keyed connection upon engagement of the rails and terminals wherein said first side rail contacts one of said protruding cell terminals at one of said apertures, and said second side rail contacts another of said protruding cell terminals in another of said apertures.

5. A system according to claim 4 wherein a side rail of said strip conductor overlaps a row of said apertures, the location of a conductor between the cell terminals in a first of said rows and the cell terminals in a second of said rows providing a series electrical connection between the cells of said first and said second rows, said keyed connection providing for the coupling of a positive terminal of one cell with the negative terminal of a second cell in said series connection.

6. A system according to claim 5 wherein said panel includes spacer bars located behind said apertures for guiding said terminals of said cells.

7. A system according to claim 6 wherein said side rails are urged towards said spacer bars for gripping said terminals.

8. A system according to claim 7 wherein said panel is supported on a trolley for movement of said cells relative to an enclosing cabinet.

9. A system for electrical activation of a set of electrochemical cells comprising:

a panel having a line of apertures for receiving individual ones of said cells in respective ones of said apertures;

an elongated conductor positioned along said line of apertures for engagement with terminals of said cells upon insertion of said cells in respective ones of said apertures; and means associated with individual ones of said apertures for keying the engagement of said conductor with said terminals to permit such engagement only upon orientation of said terminals in a prescribed direction.

10. A system according to claim 9 wherein said keying means includes means exerting a force against said conductor for gripping said terminals.

11. A system according to claim 9 wherein said conductor is offset from a center of an aperture to preclude a contacting of more than one terminal of a cell.

12. A system for electrical activation of a set of electrochemical cells comprising:

a panel having a row of apertures for receiving individual ones of said cells in respective ones of said apertures;

a plurality of strip conductors having preformed edges for mating with correspondingly formed terminals of cells received by said apertures; and wherein respective ones of said conductors are spaced relative to centers of said apertures to permit keying of connections between said conductors and said terminals, upon a receiving of said cells by said apertures, for coupling positively and negatively charged conductors of said plurality of conductors to correspondingly poled terminals of said cells.

13. A system according to claim 12 further comprising means exerting a force against an individual one of said conductors for gripping said terminals.

14. A system according to claim 13 wherein said force exerting means is shaped to fit a surface of individual ones of said terminals for keying said connection.

* * * * *